No. 697,491. Patented Apr. 15, 1902.
L. KALLING.
BOTTLE SEALING DEVICE.
(Application filed June 18, 1901.)
(No Model.)

WITNESSES:
A. O. Babendrier
Estep J. Gork

INVENTOR:
Lewis Kalling.
by Geo. W. J. Howard,
Atty.

UNITED STATES PATENT OFFICE.

LEWIS KALLING, OF BALTIMORE, MARYLAND.

BOTTLE-SEALING DEVICE.

SPECIFICATION forming part of Letters Patent No. 697,491, dated April 15, 1902.

Application filed June 18, 1901. Serial No. 65,045. (No model.)

*To all whom it may concern:*

Be it known that I, LEWIS KALLING, of the city of Baltimore and State of Maryland, have invented certain Improvements in Bottle-Sealing Devices, of which the following is a specification.

This invention relates to certain improvements in the sealing-cap shown and described in Letters Patent No. 561,792, granted to me on the 9th day of June, 1896, for a bottle-sealing device, to which reference should be made. The said patented sealing-cap embodies a hollow bead formed in its cylindrical wall, the same producing an inner annular groove, in which rests an annular joint-forming gasket, which as the said bead is flattened by the application to the cap of an annular drawing-tool, which may constitute a portion of a capping-machine, is compressed tightly between the wall of the cap and the exterior surface of the bottle-head to effect a tight joint. By reference to the drawings forming a part of the said Letters Patent it will be seen that as the annular gasket has a larger diameter than the portion of the wall below the groove formed by the hollow bead it has to be compressed or distorted from its annular shape in the act of its insertion in the groove, and consequently it is difficult to introduce the gasket into the cap by mechanical means.

The object of the present invention is therefore to produce a cap in which the gasket may be secured by machinery and preferably by means of an apparatus shown and described in the application of Albert Jones, No. 682,114, for a machine for producing bottle-sealing caps, filed on the 31st day of May, 1898, to which reference should be made.

In the further description of the said invention which follows reference is made to the accompanying drawings, forming a part hereof, and in which—

Figure 1:
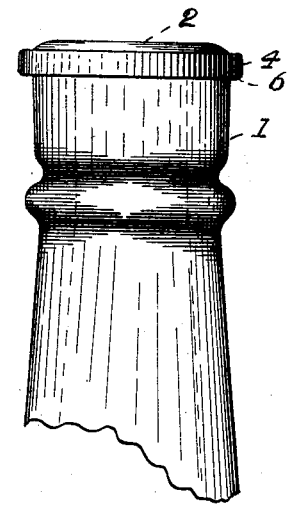
Figure 2:
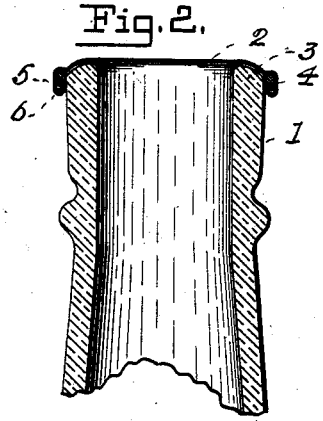
Figure 3:
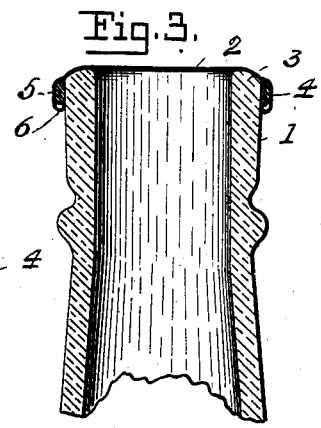
Figure 4:
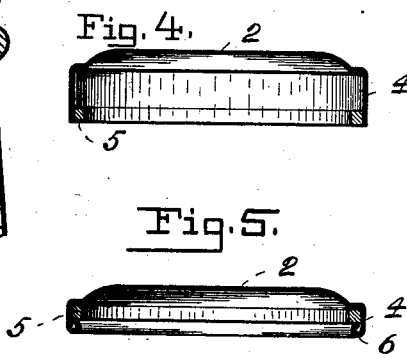
Figure 5:
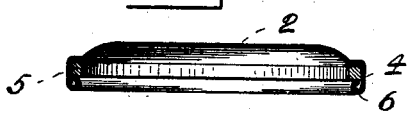
Figure 6:
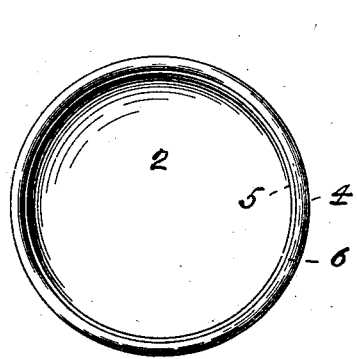

Figure 1 is an exterior side view of the upper part of a bottle provided with a sealing-cap constructed in accordance with the present invention and showing the cap as resting loosely on the bottle-head. Fig. 2 is a central section of Fig. 1. Fig. 3 is a view similar to Fig. 2, except that the cap is secured firmly in place on the bottle-head and a tight joint effected. Fig. 4 is an enlarged central section of the sealing-cap as it appears before the joint-forming gasket is secured therein. Fig. 5 is a view similar to Fig. 4, showing the sealing-cap as it appears after the joint-forming gasket is secured therein. Fig. 6 is an under side view of Fig. 5.

Referring now to the drawings, 1 is the bottle-head, which is shown as slightly tapered from the top or lip, but which may be cylindrical or any other shape, if desired, as the present invention does not include any particular formation of the bottle-head.

2 is the crown of the sealing-cap, which is shown as fitting the exterior lip 3 of the bottle-head.

4 is the cylindrical wall of the sealing-cap, having an inner diameter which is considerably greater than that of the bottle-head in order to admit of the placing of the compressible annular gasket 5 therein.

The sealing-cap as first formed is shown in Fig. 4, and by reference to that figure it will be seen that the annular gasket 5, which is inserted in the cap by means of the apparatus shown and described in the pending application, before alluded to, is flush with the edge of the wall. In another and subsequent operation of the said apparatus the edge of the cap is turned in, as best shown in Fig. 5, to form the gasket-holding bead 6, and in the act of forming this bead the gasket is pushed in contact with the crown 2 of the cap.

It will be understood that the finished sealing-cap differs from that shown and described in the said Letters Patent in that its entire annular wall has to be flattened or reduced in diameter in the cap-affixing operation instead of a part only thereof.

The gasket when introduced into the sealing-cap is quite soft; but after it is secured therein by beading the edge of the wall it is hardened by an ordinary vulcanizing process effected in a properly-constructed vulcanizing-oven; but the vulcanizing process forms no part of the present invention.

In the cap-affixing operation the annular wall of the cap is elongated and reduced in diameter; but the drawing process whereby such change in the shape of the cap is effected does not remove the inturned bead from contact with the said gasket, for the reason that as the gasket is reduced in thickness its length is correspondingly increased.

I claim as my invention—

A sealing-cap adapted for application to a bottle-head, which consists of a crown, and a compressible cylindrical annular wall depending therefrom, the said wall having its edge provided with an inturned bead of an external diameter corresponding with that of the cylindrical wall, combined with an annular compressible joint-forming gasket situated within the annular wall and above and in contact with the inturned bead, and which annular gasket, as the said annular wall is reduced in diameter, in the cap-affixing operation, is compressed so as to form a joint between the said wall and the bottle-head, substantially as, and for the purpose specified.

LEWIS KALLING.

Witnesses:
OREGON MILTON DENNIS,
ESTEP T. GOTT.